United States Patent
Yang

(10) Patent No.: US 12,279,043 B2
(45) Date of Patent: Apr. 15, 2025

(54) METHOD AND APPARATUS OF CAPTURING IMAGE, ELECTRONIC DEVICE AND COMPUTER READABLE STORAGE MEDIUM

(71) Applicant: Lenovo (Beijing) Limited, Beijing (CN)

(72) Inventor: Shuangxin Yang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 136 days.

(21) Appl. No.: 18/182,914

(22) Filed: Mar. 13, 2023

(65) Prior Publication Data

US 2023/0319414 A1    Oct. 5, 2023

(30) Foreign Application Priority Data

Mar. 30, 2022   (CN) .......................... 202210332053.8

(51) Int. Cl.
   *H04N 23/69*   (2023.01)
   *G06F 3/14*    (2006.01)
   (Continued)

(52) U.S. Cl.
   CPC .............. *H04N 23/69* (2023.01); *G06F 3/14* (2013.01); *G06T 5/70* (2024.01); *G06T 7/50* (2017.01);
   (Continued)

(58) Field of Classification Search
   CPC .... H04N 23/611; H04N 23/667; H04N 23/67; H04N 23/69; H04N 23/81; H04N 23/815;
   (Continued)

(56) References Cited

U.S. PATENT DOCUMENTS

| | | | |
|---|---|---|---|
| 9,819,931 B2 * | 11/2017 | Lee ...................... | H04N 13/246 |
| 2015/0312537 A1 * | 10/2015 | Solhusvik ............ | H04N 25/133 348/302 |

(Continued)

FOREIGN PATENT DOCUMENTS

| | | |
|---|---|---|
| CN | 110572581 A | 12/2019 |
| CN | 111131714 A | 5/2020 |
| CN | 113228616 A | 8/2021 |

*Primary Examiner* — Lin Ye
*Assistant Examiner* — Chriss S Yoder, III
(74) *Attorney, Agent, or Firm* — ANOVA LAW GROUP, PLLC

(57) ABSTRACT

A method of capturing an image includes: obtaining a target photographing magnification of a target camera mode, the target photographing magnification being one of N different photographing magnifications corresponding to the target camera mode, and the target camera mode corresponding to at least one camera module; controlling the at least one camera module to capture the image based on the target photographing magnification, including controlling an image sensor of a target camera module to operate in a target operation mode to capture the image based on the target photographing magnification, different operation modes of the image sensor of the target camera module corresponding to different photographing magnifications; processing the captured image; and displaying the captured image after processing.

20 Claims, 12 Drawing Sheets

(51) Int. Cl.
  *G06T 5/70* (2024.01)
  *G06T 7/50* (2017.01)
  *H04N 23/667* (2023.01)
  *H04N 25/46* (2023.01)

(52) U.S. Cl.
  CPC ........... *H04N 23/667* (2023.01); *H04N 25/46* (2023.01); *G06T 2207/20182* (2013.01)

(58) Field of Classification Search
  CPC ...... H04N 23/951; H04N 25/42; H04N 25/46; G06F 3/14; G06T 5/70; G06T 7/50; G06T 2207/20182; G09G 5/373; G09G 5/391; G09G 2340/12; G09G 2340/0457; G09G 2360/144
  See application file for complete search history.

(56) References Cited

U.S. PATENT DOCUMENTS

| | | | |
|---|---|---|---|
| 2016/0037067 A1* | 2/2016 | Lee | H04N 23/56 348/208.6 |
| 2020/0112692 A1* | 4/2020 | Ling | H04N 23/45 |
| 2020/0204746 A1* | 6/2020 | Kang | H04N 25/134 |
| 2021/0067749 A1* | 3/2021 | Yadav | H04N 23/667 |

\* cited by examiner

Oath o

```
┌─────────────────────────────────────────────────────────────┐
│ Obtaining a target photographing magnification of a target   │  S101
│ camera mode, the target photographing magnification          │
│ belonging to N different photographing magnifications        │
│ corresponding to the target camera mode, and the target      │
│ camera mode corresponds to at least one camera module        │
└─────────────────────────────────────────────────────────────┘
                              │
                              ▼
┌─────────────────────────────────────────────────────────────┐
│ Controlling at least one camera module to capture an image   │
│ based on the target photographing magnification, where       │
│ controlling the at least one camera module to capture the    │  S102
│ image based on the target photographing magnification        │
│ includes: controlling the image sensor of the target camera  │
│ module in a target operation mode to capture the image based │
│ on the target photographing magnification, different         │
│ operation modes of the image sensor of the target camera     │
│ module corresponding to different photographing magnifications│
└─────────────────────────────────────────────────────────────┘
                              │
                              ▼
┌─────────────────────────────────────────────────────────────┐
│              Processing the captured image                   │  S103
└─────────────────────────────────────────────────────────────┘
                              │
                              ▼
┌─────────────────────────────────────────────────────────────┐
│         Displaying the captured image after processing       │  S104
└─────────────────────────────────────────────────────────────┘
```

FIG. 1

Obtaining the target photographing magnification of the target camera mode, the target photographing magnification being one of N different photographing magnifications corresponding to the target camera mode, the target camera mode corresponding to at least one camera module, N different photographing magnifications corresponding to the target camera mode at least including a first photographing magnification and a second photographing magnification — S201

Controlling at least one camera module to capture an image based on the target photographing magnification, where controlling the at least one camera module to capture the image based on the target photographing magnification includes: determining the operation mode of the image sensor of the target camera module as a first binning mode based on the first photographing magnification, the first binning mode being used to output the sensing information with a binning pixel array, the binning pixel combining a plurality of adjacent sensing pixel units into one binning pixel unit according to a first binning rule in the pixel array of the image sensor; or determining the operation mode of the image sensor of the target camera module as the full pixel mode based on the second photographing magnification, the full pixel mode being used to output the sensing information with a sensing pixel unit array of the image sensor — S202

Processing the captured image — S203

Displaying the captured image after processing — S204

FIG. 2A

```
┌─────────────────────────────────────────────────────────────┐
│  Obtaining a target photographing magnification of a target │   S301
│  camera mode, the target photographing magnification being  │
│  one of N different photographing magnifications            │
│  corresponding to the target camera mode, and the target    │
│  camera mode corresponds to at least one camera module      │
└─────────────────────────────────────────────────────────────┘
                              │
                              ▼
┌─────────────────────────────────────────────────────────────┐
│  Controlling the target camera module to capture M images   │
│  based on the target photographing magnification and an     │
│  ambient light intensity, M being an integer greater than   │
│  or equal to 1, different numbers of images being captured  │
│  for different target photographing magnifications based    │   S302
│  on different ambient light intensities, and controlling    │
│  the at least one camera module to capture the image based  │
│  on the target photographing magnification includes:        │
│  controlling the image sensor of the target camera module   │
│  in the target operation mode to capture the image based on │
│  the target photographing magnification, different          │
│  operation modes of the image sensor of the target camera   │
│  module corresponding to different photographing            │
│  magnifications                                             │
└─────────────────────────────────────────────────────────────┘
                              │
                              ▼
┌─────────────────────────────────────────────────────────────┐   S303
│              Processing the captured image                  │
└─────────────────────────────────────────────────────────────┘
                              │
                              ▼
┌─────────────────────────────────────────────────────────────┐   S304
│         Displaying the captured image after processing      │
└─────────────────────────────────────────────────────────────┘
```

FIG. 3

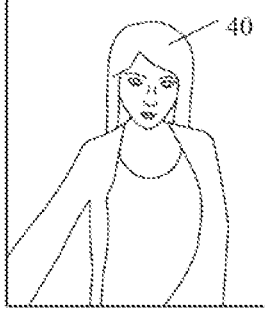 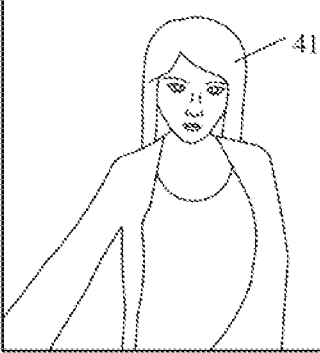 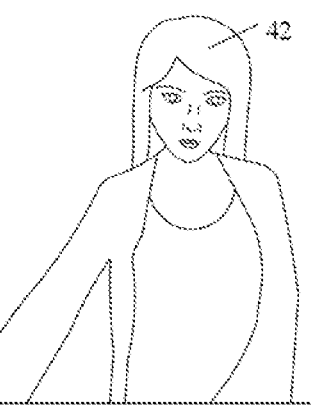
FIG. 4A  FIG. 4B  FIG. 4C
FIG. 4

METHOD AND APPARATUS OF CAPTURING IMAGE, ELECTRONIC DEVICE AND COMPUTER READABLE STORAGE MEDIUM

CROSS-REFERENCE TO RELATED APPLICATION

This application claims priority to Chinese Patent Application No. 202210332053.8, filed on Mar. 30, 2022, the entire content of which is incorporated herein by reference.

TECHNICAL FIELD

The present disclosure relates to the technical field of electronic devices and, more particularly, to a method and an apparatus of capturing an image, an electronic device, and a computer-readable storage medium.

BACKGROUND

Shooting images with a single camera module having a short focal length has the following disadvantages. The field of view (FOV) of the images is large, such that subjects do not stand out in the images. The image distortion is substantial, such that the subjects in the periphery of the images are often deformed. In related art, electronic devices are equipped with a plurality of N-magnification camera modules having equivalent focal lengths to capture the images, and to adjust proportions of the subjects in the images to achieve the effect of highlighting the subjects to certain extent. However, adding the camera modules likely increases the hardware cost, making it unlikely to be widely adopted. In addition, in the related art, the N-magnification images may be captured through digital zooming. However, after digital zooming, the resolution of the images is reduced to $1/N^2$ of the original images which results in the problem of insufficient resolution. It is difficult to satisfy the resolution requirement while highlighting the subjects at the same time.

SUMMARY

One aspect of the present disclosure provides a method of capturing an image. The method includes: obtaining a target photographing magnification of a target camera mode, the target photographing magnification being one of N different photographing magnifications corresponding to the target camera mode, and the target camera mode corresponding to at least one camera module; controlling the at least one camera module to capture the image based on the target photographing magnification, including controlling an image sensor of a target camera module to operate in a target operation mode to capture the image based on the target photographing magnification, different operation modes of the image sensor of the target camera module corresponding to different photographing magnifications; processing the captured image; and displaying the captured image after processing.

Another aspect of the present disclosure provides a apparatus of capturing an image. The apparatus includes a memory storing program instructions; and a processor coupled to the memory. When being executed by the processor, the program instructions cause the processor to: obtain a target photographing magnification of a target camera mode, the target photographing magnification being one of N different photographing magnifications corresponding to the target camera mode, and the target camera mode corresponding to at least one camera module; control the at least one camera module to capture the image based on the target photographing magnification, including controlling an image sensor of a target camera module to operate in a target operation mode to capture the image based on the target photographing magnification, different operation modes of the image sensor of the target camera module corresponding to different photographing magnifications; process the captured image; and display the captured image after processing.

Another aspect of the present disclosure provides an electronic device. The electronic device includes a memory storing program instructions; a processor coupled to the memory; and at least one camera module. When being executed by the processor, the program instructions cause the processor to: obtain a target photographing magnification of a target camera mode, the target photographing magnification being one of N different photographing magnifications corresponding to the target camera mode, and the target camera mode corresponding to the at least one camera module; control the at least one camera module to capture an image based on the target photographing magnification, including controlling an image sensor of a target camera module to operate in a target operation mode to capture the image based on the target photographing magnification, different operation modes of the image sensor of the target camera module corresponding to different photographing magnifications; process the captured image; and display the captured image after processing.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

FIG. 1 is a flowchart of an exemplary photographing method according to some embodiments of the present disclosure;

FIG. 2A is a flowchart of another exemplary photographing method according to some embodiments of the present disclosure;

FIG. 3 is a flowchart of another exemplary photographing method according to some embodiments of the present disclosure;

FIG. 4A is a schematic diagram of an application scene of a portrait camera mode in the related art;

FIG. 4B is a schematic diagram of an application scene of another portrait camera mode in the related art;

FIG. 4C is a schematic diagram of an application scene of another portrait camera mode in the related art;

DETAILED DESCRIPTION OF THE EMBODIMENTS

Figure 2B:
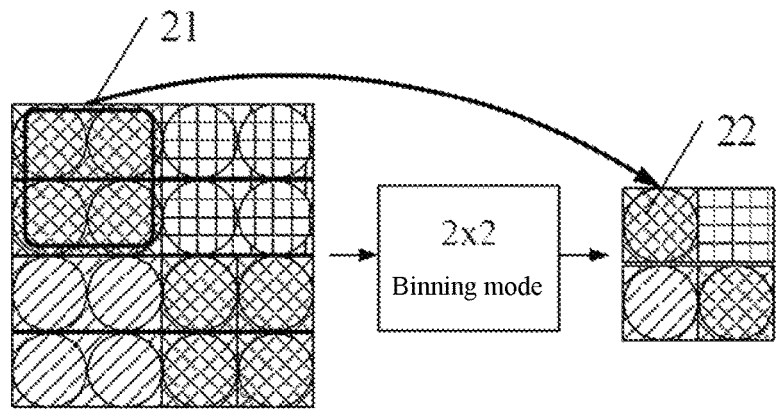
FIG. 2B is a schematic diagram showing operation principle of an exemplary camera mode according to some embodiments of the present disclosure.

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

It should be understood that reference throughout the specification to "one embodiment" or "an embodiment" means that a particular feature, structure, or characteristic related to the embodiment is included in at least one embodiment of the present disclosure. Thus, appearances of "in one embodiment" or "in an embodiment" in various places throughout the specification are not necessarily referring to the same embodiment. Furthermore, the particular features, structures or characteristics may be combined in any suitable manner in one or more embodiments. It should be understood that, in various embodiments of the present disclosure, the sequence numbers of the above-described processes do not refer to an execution order. The execution order of the processes should be determined by their functions and internal logic, and should not be used to limit the embodiments of the present disclosure. The sequence numbers in the embodiments of the present disclosure are intended for description only, and do not represent the advantages and disadvantages of the embodiments.

In some embodiments, unless otherwise defined, the technical terms or scientific terms used in the description of the embodiments of the present disclosure should have the usual meanings understood by those skilled in the art to which the embodiments of the present disclosure belong. "first\second" and similar words used in the embodiments of the present disclosure do not indicate any order, quantity or importance, but are only used to distinguish similar components.

Those skilled in the art should understand that unless otherwise defined, all terms (including technical terms and scientific terms) used herein have the same meanings as those of ordinary skill in the art to which the embodiments of the present disclosure belong. It should also be understood that terms, such as those defined in commonly used dictionaries, should be understood to have meanings consistent with their meaning in the context of the prior art, and unless specifically defined as herein, are not intended to be idealized or overly formalized.

Before describing the embodiments of the present disclosure, terms and concepts involved in the embodiments of the present disclosure are introduced.

1. Pixel Binning

Pixel binning is an effective way to reduce the resolution without losing the viewing angle FOV. It is to physically superimpose or average charges of adjacent pixel units, and then output a signal as one pixel. 2×2 pixel binning is to perform the above processing on the adjacent four pixels, and the resolution of the processed image is ¼ of the original resolution. The above processing is performed in photosensitive components (image sensors).

2. Down-Sampling

There are two main objectives of down-sampling: reducing an image size, and generating a thumbnail of the corresponding image. Down-sampling operation is as follows. For example, an image I has a M*N resolution, where M and N are positive integers. The image is down-sampled at a rate of s, that is, an image of (M/s)*(N/s) resolution is obtained, and s is a common divisor of M and N. For an image in matrix form, the image in the original image s*s window is converted into a pixel, and the value of this pixel is a mean value of all pixels in the original image s*s window.

3. Image Signal Processor (ISP)

An image signal processor is a chip used in a camera or a device with a photographing function. The above-described down-sampling operation is performed in the ISP.

FIG. 1 is a flowchart of an exemplary photographing method according to some embodiments of the present disclosure. As shown in FIG. 1, the method includes the following processes.

At S101, a target photographing magnification of a target camera mode is obtained. The target photographing magnification is one of N different photographing magnifications corresponding to the target camera mode. The target camera mode corresponds to at least one camera module.

In some embodiments, the target camera mode may be a portrait mode. The N different magnifications and the target photographing magnification are related to a type of an image sensor in the camera module. For example, when the image sensor is a 4-to-1 image sensor, N is 2. The target photographing magnification may be 1 or 2. When the image sensor is a 9-to-1 image sensor, N is 3. The target photographing magnification may be any value between 1 and 3. When the image sensor is a 16-to-1 image sensor, N is 4. The target photographing magnification may be any value between 1 and 4. When the image sensor is a 25-to-1 image sensor, N is 5. The target photographing magnification may be any value between 1 and 5.

At S102, at least one camera module is controlled to capture an image based on the target photographing magnification.

In some embodiments, controlling the at least one camera module to capture the image based on the target photographing magnification includes: controlling the image sensor of the target camera module in a target operation mode to capture the image based on the target photographing magnification. Different operation modes of the image sensor of the target camera module correspond to different photographing magnifications.

In some embodiments, each camera module includes one image sensor. The one image sensor is a N-to-1 image sensor. The N-to-1 image sensor includes two operation modes: a binning mode and a full pixel mode. In the binning mode, N pixels are combined into one big pixel for output to obtain a desired photographing effect under light of different intensities. In the full pixel mode, each pixel individually outputs sensing information to a sensing unit array of the image sensor. The target operation mode may be the binning mode or the full pixel mode.

In some embodiments, the at least one camera module includes a target camera module and a depth-of-field camera module. The target camera module may be a camera module including a N-to-1 image sensor. Different operation modes of the image sensor of the target camera module may be used to capture a portrait without pixel loss under the condition of different target photographing magnifications.

At S103, the captured image is processed.

In some embodiments, a noise reduction processing may be performed on the captured image. In some other embodiments, a clarity processing may be performed on a subject or a background of the captured image to reduce the noise in the captured image.

At S104, the captured image after processing is displayed.

In some embodiments, the target photographing magnification of the target camera mode is obtained. The target photographing magnification is one of N different photographing magnifications corresponding to the target camera mode. The target camera mode corresponds to at least one camera module. The at least one camera module is controlled to capture the image based on the target photographing magnification. Controlling the at least one camera module to capture the image based on the target photographing magnification includes: controlling the image sensor of the target camera module to operate in the target operation mode to capture the image based on the target photographing magnification. Different operation modes of the image sensor of the target camera module correspond to different photographing magnifications. On one hand, under the circumstance of different target photographing magnifications, the target camera module is controlled to capture images of a same resolution, thereby achieving photographing without pixel loss and reducing the number of cameras. On the other hand, one camera module is able to capture a magnified portrait without pixel loss. A minimum number of cameras may be integrated into an electronic device having a photographing function. One camera is able to achieve a photographing effect of multiple cameras, thereby reducing production cost.

FIG. 2A is a flowchart of another exemplary photographing method according to some embodiments of the present disclosure. As shown in FIG. 2A, the photographing method includes the following processes.

At S201, the target photographing magnification of the target camera mode is obtained. The target photographing magnification is one of N different photographing magnifications corresponding to the target camera mode. The target camera mode corresponds to at least one camera module. N different photographing magnifications corresponding to the target camera mode at least includes a first photographing magnification and a second photographing magnification.

At S202, the at least one camera module is controlled to capture the image based on the target photographing magnification.

At S203, the captured image is processed.

At S204, the captured image after processing is displayed.

In some embodiments, controlling the at least one camera module to capture the image based on the target photographing magnification includes: determining the operation mode of the image sensor of the target camera module as a first binning mode based on the first photographing magnification. The first binning mode is used to output the sensing information with a binning pixel array. The binning pixel combines a plurality of adjacent sensing pixel units into one binning pixel unit according to a first binning rule in the pixel array of the image sensor. In some other embodiments, controlling the at least one camera module to capture the image based on the target photographing magnification includes: determining the operation mode of the image sensor of the target camera module as the full pixel mode based on the second photographing magnification. The full pixel mode is used to output the sensing information with a sensing pixel unit array of the image sensor.

Figure 2C:
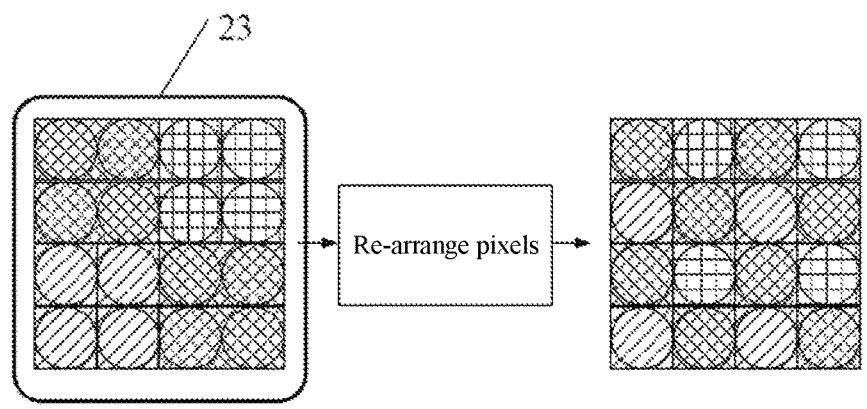
FIG. 2C is a schematic diagram showing operation principle of another exemplary camera mode according to some embodiments of the present disclosure.

For example, the image sensor is a 4-to-1 image sensor. When the target photographing magnification is 1, the image sensor of the target camera module is controlled to operate in the binning mode to capture the image. When the target photographing magnification is 2, the image sensor of the target camera module is controlled to operate in the full pixel mode to capture the image. Thus, when the target photographing magnification is 1 and 2, the same 4-to-1 image sensor can be used to capture the portrait without pixel loss. As shown in FIG. 2B, when being operated in the first binning mode, the 4-to-1 image sensor combines four pixels in an area 21 into one larger pixel in an area 22, such that the desired photographing effect can be achieved under different intensities of light. As shown in FIG. 2C, when being operated in the full pixel mode, the 4-to-1 image sensor re-arranges sixteen pixels in an area 23 to obtain sixteen pixels that satisfy a pixel distribution rule. Because no pixels are combined, the image obtained in the full pixel mode has a high resolution, and capable of capturing fine details in the image.

Figure 2D:
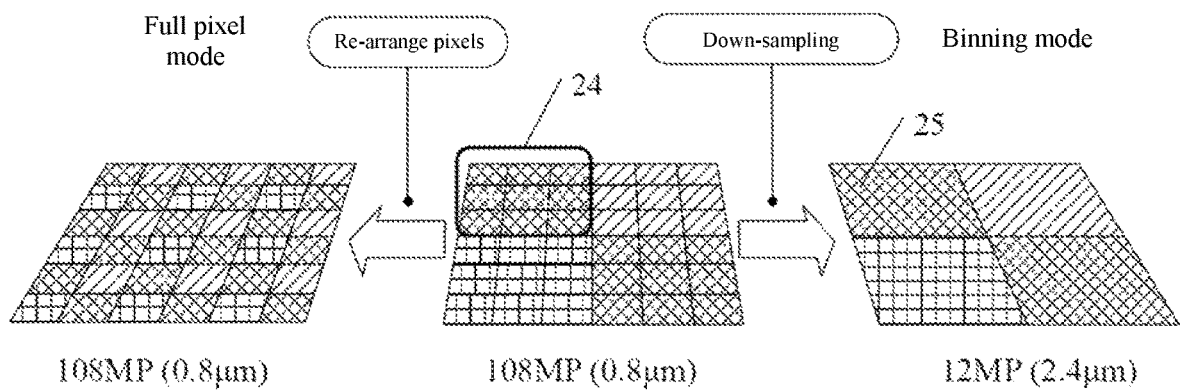
FIG. 2D is a schematic diagram showing operation principle of another exemplary camera mode according to some embodiments of the present disclosure.

For example, the image sensor is a 9-to-1 image sensor. When the target photographing magnification is 1, the image sensor of the target camera module is controlled to operate in the binning mode to capture the image. When the target photographing magnification is 2 and 3, the image sensor of the target camera module is controlled to operate in the full pixel mode to capture the image. Thus, when the target photographing magnification is in a range between 1 and 3, the same 9-to-1 image sensor can be used to capture the portrait without pixel loss. As shown in FIG. 2D, when being operated in the first binning mode, the 9-to-1 image sensor combines nine pixels in an area 24 into one larger pixel in an area 25, such that the desired photographing effect can be achieved under different intensities of light. When being operated in the full pixel mode, the 9-to-1 image sensor re-arranges thirty-six pixels to obtain thirty-six pixels that satisfy the pixel distribution rule.

Figure 2E:
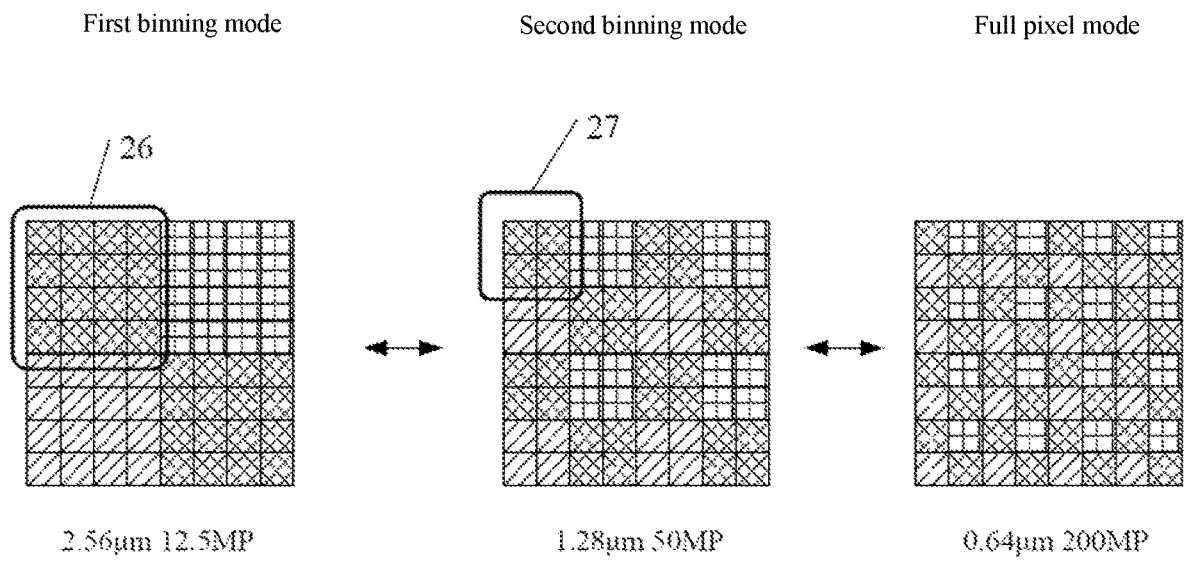
FIG. 2E is a schematic diagram showing operation principle of another exemplary camera mode according to some embodiments of the present disclosure.
Figure 2F:
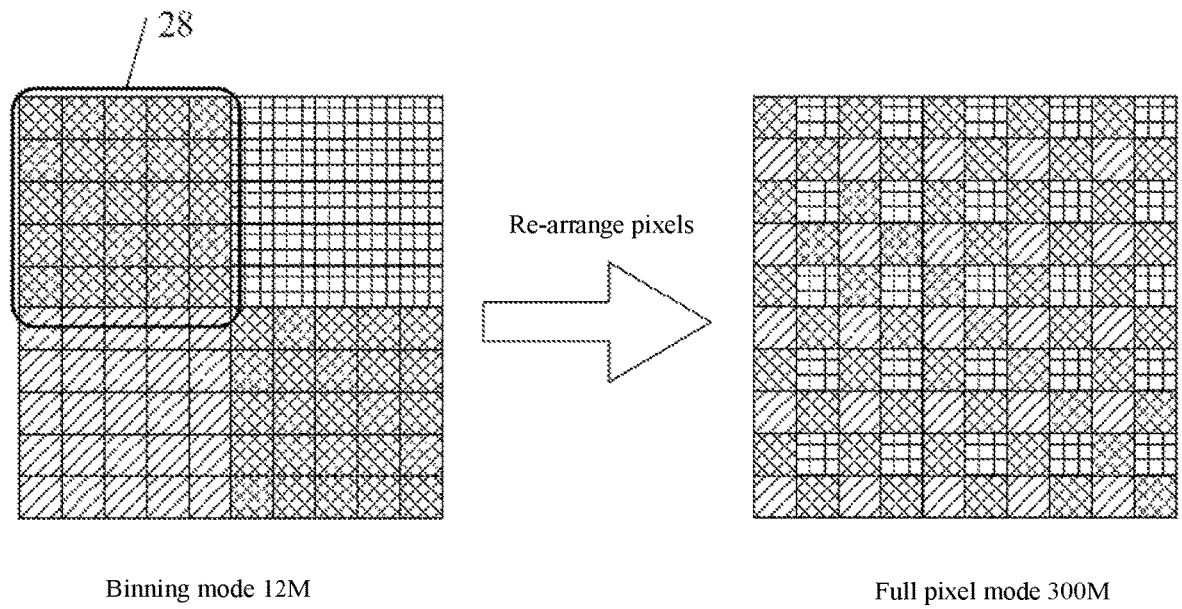
FIG. 2F is a schematic diagram showing operation principle of another exemplary camera mode according to some embodiments of the present disclosure.

For example, the image sensor is a 25-to-1 image sensor. When the target photographing magnification is 1, the image sensor of the target camera module is controlled to operate in the binning mode to capture the image. When the target photographing magnification is in a range between 2 and 5, the image sensor of the target camera module is controlled to operate in the full pixel mode to capture the image. Thus, when the target photographing magnification is in a range between 1 and 5, the same 25-to-1 image sensor can be used to capture the portrait without pixel loss. As shown in FIG. 2F, when being operated in the first binning mode, the 25-to-1 image sensor combines twenty fix pixels in an area 28 into one larger pixel. When being operated in the full pixel mode, the 25-to-1 image sensor re-arranges one hundred pixels to obtain one hundred pixels that satisfy the pixel distribution rule.

In some embodiments, N different photographing magnifications corresponding to the target camera mode further includes a third photographing magnification. The third photographing magnification is between the first photographing magnification and the second photographing magnification. Controlling the image sensor of the target camera module to operate in the target operation mode to capture the image based on the target photographing magnification includes: determining the operation mode of the image sensor of the target camera module based on the third photographing magnification as a second binning mode, a binning rule of the second binning mode being different from a binning rule of the first binning mode; and/or controlling a digital zoom magnification based on the third photographing magnification, the digital zoom magnification corresponding to the third photographing magnification.

In some embodiments, when the third photographing magnification is greater than the first photographing magnification, the second binning mode adopts an M-to-1 binning rule. The first binning mode adopts an N-to-1 binning rule. M is smaller than N.

For example, the image sensor is a 16-to-1 image sensor. When the target photographing magnification is 1 or 2, the image sensor of the target camera module is controlled to operate in the binning mode to capture the image. When the target photographing magnification is 1, the first binning mode adopts a 16-to-1 binning mode. When the target photographing magnification is 2, the second binning mode adopts a 4-to-1 binning mode. When the target photographing magnification is in a range between 3 and 4, the image sensor of the target camera module is controlled to operate in the full pixel mode to capture the image. Thus, when the target photographing magnification is in a range between 1 and 4, the same 16-to-1 image sensor can be used to capture the portrait without pixel loss. As shown in FIG. 2E, the 16-to-1 image sensor supports three modes, including two different binning modes and the full pixel mode. The first binning mode is the 16-to-1 binning mode, in which sixteen pixels in an area 26 is combined into one larger pixel. The second binning mode is the 4-to-1 binning mode, in which four pixels in an area 27 is combined into one larger pixel. As such, a balance between the resolution and the photographing effect is achieved. In the full pixel mode, sixty four pixels are re-arranged to obtain sixty four pixels that satisfy the pixel distribution rule.

In some embodiments, portraits with different magnifications may achieve the same resolution through the digital zoom. In some other embodiments, the portraits with different magnifications may achieve the same resolution through the down-sampling method.

For example, the image sensor is the 25-to-1 image sensor. The portraits with the same resolution and different magnifications may be captured in scenarios described below. In the first scenario, the portrait with the photographing magnification being 1 is captured by the 25-to-1 image sensor operated in the binning mode. When the captured portrait has 300 M pixels, the portrait after 25-to-1 merging has 12 M pixels. In the second scenario, the portrait is captured with the photographing magnification being 2. When the captured portrait has 300 M pixels, the portrait after 2*2 down-sampling and 2 times digital zoom has 300 M/4*4 pixels. To maintain a consistent resolution, the portrait is shrunk to 16/25 to obtain a reduced portrait with 12 M pixels. In the third scenario, the portrait is captured with the photographing magnification being 3. When the captured portrait has 300 M pixels, the portrait after 3 times digital zoom is shrunk to 9/25 to obtain the reduced portrait with 12 M pixels. In the fourth scenario, the portrait is captured with the photographing magnification being 4. When the captured portrait has 300 M pixels, the portrait after 4 times digital zoom is shrunk to 16/25 to obtain the reduced portrait with 12 M pixels. In the fifth scenario, the portrait is captured with the photographing magnification being 5. When the captured portrait has 300 M pixels, the portrait after 5 times digital zoom has 12 M pixels.

In the embodiments of the present disclosure, the image processing methods such as adjusting the operation mode of the image sensor of the target camera module and the digital zoom are used to adjust the resolution of the portrait images with different photographing magnifications, such that the same image sensor of the target camera module is able to capture the portrait images with the same resolution and different photographing magnifications.

FIG. 3 is a flowchart of another exemplary photographing method according to some embodiments of the present disclosure. As shown in FIG. 3, the photographing method includes the following processes.

At S301, the target photographing magnification of the target camera mode is obtained. The target photographing magnification is one of the N different photographing magnifications corresponding to the target camera mode. The target camera mode corresponds to at least one camera module.

At S302, the image sensor of the target camera module is controlled to capture M images based on the target photographing magnification and an ambient light intensity. M is an integer greater than or equal to 1. Different numbers of images are captured for different target photographing magnifications based on different ambient light intensities.

Alternatively, the image sensor of the target camera module is controlled to capture M images based on the target photographing magnification and an ambient light intensity. The greater the target photographing magnification, the larger the number M of images to be captured.

For example, Table 1 illustrates the number of portraits captured under different ambient light intensities when the 4-to-1 image sensor photographs the portraits with different magnifications. As shown in Table 1, multi-frame noise reduction is performed when capturing the portraits. A number of photographing frames taken by the target camera module is determined according to the target photographing magnification of the portraits. Table 2 illustrates the number of portraits captured under different ambient light intensities when the 9-to-1 image sensor photographs the portraits with different magnifications. Table 3 illustrates the number of portraits captured under different ambient light intensities when the 16-to-1 image sensor photographs the portraits with different magnifications. Table 4 illustrates the number of portraits captured under different ambient light intensities when the 25-to-1 image sensor photographs the portraits with different magnifications. As shown in Tables 1-4, under any ambient light intensity, two more input images are captured for the portraits with N magnifications than the portraits with (N−1) magnifications, thereby achieving the desired noise reduction effect.

Therefore, when the same target camera module is used to capture the portraits with the photographing magnifications being 1 or 2, multiple image frames are taken to keep image quality consistent regardless of pixel sizes of the portraits. Thus, an impact of smaller pixels on image quality is minimized.

TABLE 1

Number of portraits captured under different ambient light intensities using the 4-to-1 image sensor with different magnifications

| Ambient light intensity (lux) | 1× magnification # of portraits | 2× magnification # of portraits |
|---|---|---|
| 0~3 | 6 | 8 |
| 3~5 | 5 | 7 |
| 5~20 | 4 | 6 |
| 20~50 | 3 | 5 |
| 50~200 | 2 | 4 |
| 200~INF | 1 | 3 |

TABLE 2

Number of portraits captured under different ambient light intensities using the 9-to-1 image sensor with different magnifications

| Ambient light intensity (lux) | 1× magnification # of portraits | 2× magnification # of portraits | 3× magnification # of portraits |
|---|---|---|---|
| 0~3 | 6 | 8 | 10 |
| 3~5 | 5 | 7 | 9 |
| 5~20 | 4 | 6 | 8 |
| 20~50 | 3 | 5 | 7 |
| 50~200 | 2 | 4 | 6 |
| 200~INF | 1 | 3 | 5 |

TABLE 3

Number of portraits captured under different ambient light intensities using the 16-to-1 image sensor with different magnifications

| Ambient light intensity (lux) | 1× magnification # of portraits | 2× magnification # of portraits | 3× magnification # of portraits | 4× magnification # of portraits |
|---|---|---|---|---|
| 0~3 | 6 | 8 | 10 | 12 |
| 3~5 | 5 | 7 | 9 | 11 |
| 5~20 | 4 | 6 | 8 | 10 |
| 20~50 | 3 | 5 | 7 | 9 |
| 50~200 | 2 | 4 | 6 | 8 |
| 200~INF | 1 | 3 | 5 | 7 |

TABLE 4

Number of portraits captured under different ambient light intensities using the 25-to-1 image sensor with different magnifications

| Ambient light intensity (lux) | 1× magnification # of portraits | 2× magnification # of portraits | 3× magnification # of portraits | 4× magnification # of portraits | 5× magnification # of portraits |
|---|---|---|---|---|---|
| 0~3 | 6 | 8 | 10 | 12 | 14 |
| 3~5 | 5 | 7 | 9 | 11 | 13 |
| 5~20 | 4 | 6 | 8 | 10 | 12 |
| 20~50 | 3 | 5 | 7 | 9 | 11 |
| 50~200 | 2 | 4 | 6 | 8 | 10 |
| 200~INF | 1 | 3 | 5 | 7 | 9 |

At S303, the capture image is processed.

At S304, the captured image after processing is displayed.

Controlling the at least one camera module to capture the image based on the target photographing magnification includes: controlling the image sensor of the target camera module to operate in the target operation mode to capture the image based on the target photographing magnification. Different operation modes of the image sensor of the target photographing camera module correspond to different photographing magnifications.

In some embodiments, S303 further includes: performing the noise reduction processing on M captured images.

For example, noise points in M captured images are compared. A pixel replacement method is used to replace the noise points in the images with points in multiple image frames to reduce the noise in the images.

In some embodiments, controlling the at least one camera module to capture the image based on the target photographing magnification includes: capturing the image using the depth-of-field camera module. S303 further includes: calculating depth information based on the depth-of-field camera module.

In some embodiments, when determining the depth information, the depth-of-field camera module, the target camera module, and a photographed object form a triangle. Based on the triangle principle, the depth information for a depth between any point in the photographed image and the target camera module is obtained.

In some embodiments, the target camera mode is the portrait mode, and S303 further includes the following processes.

At S3031, a plurality of images captured by the image sensor of the target camera module operated in the target operation mode and controlled based on the target photographing magnification are processed based on the depth information, such that a subject area in each of the plurality of images is clear and an area outside the subject area is blurred.

At S3032, the noise reduction processing is performed on the M captured images that are processed based on the depth information to generate a target image.

In some embodiments, the subject may be a person or an object. The image with a clear subject area and a blurred are outside the subject area may be obtained by comparing a distance between each pixel in the image and the target camera module with a distance threshold. For example, no processing is performed on pixels within the distance threshold, and a processing method such as Gaussian blur is used to simulate optical blurring for pixels outside a range of the distance threshold. Thus, the depth information makes the portrait clear within the distance threshold, and blurs background information outside the range of the distance threshold, thereby highlighting a human subject in the image.

In some embodiments, a multi-frame image noise reduction method may be used to obtain the target image after the noise reduction.

In some embodiments, the plurality of images captured by the image sensor of the target camera module that is controlled to operate in the target operation mode based on the target photographing magnification are processed based on the depth information, such that the subject area in each of the plurality of captured images is clear and the area outside the subject area is blurred. The noise reduction processing is performed on M captured images processed based on the depth information to generate the target image. Thus, the area outside the subject area is blurred, and the plurality of captured images are used to achieve the image noise reduction.

In the field of photography, compared with the photographing effect of the person 40 in FIG. 4A, the person 41 may be captured by the camera module (lens) with a focal length of 50 mm as shown in FIG. 4B, thereby achieving the desired balance between a viewing angle and a photographing distance. The person may be captured by the camera module with an even longer focal length. For example, as shown in FIG. 4C, the person 42 is captured by the lens with the focal length of 85 mm. As shown in FIG. 4A, FIG. 4B, and FIG. 4C, the photographed person occupies a gradually larger proportion in the images sequentially, and the balance effect between the viewing angle and the photographing distance increases sequentially.

In the field of mobile phones, the primary camera lens is often a wide-angle lens with an equivalent focal length of 25 mm. Using the primary photographing lens of a mobile phone to capture images such as portraits includes the following disadvantages: an overly large image FOV that makes the person unable to stand out in the image, and a substantial image distortion that deforms human faces in an image periphery. In the related technologies, an electronic device such as a mobile phone is equipped with a 50 mm-equivalent 2× portrait lens, or an N magnification portrait lens with other focal lengths to capture the images. However, adding the lens is likely to increase hardware cost, making it less likely to be widely applied. In addition, the related technologies may use a digital zoom method to photograph N-magnification portrait. However, after being digitally zoomed, the image resolution is reduced to $1/N^2$ of the original, causing the problem of insufficient resolution.

To solve the above-described problems, the present disclosure provides another photographing method. The method includes the following processes.

Figure 5A:
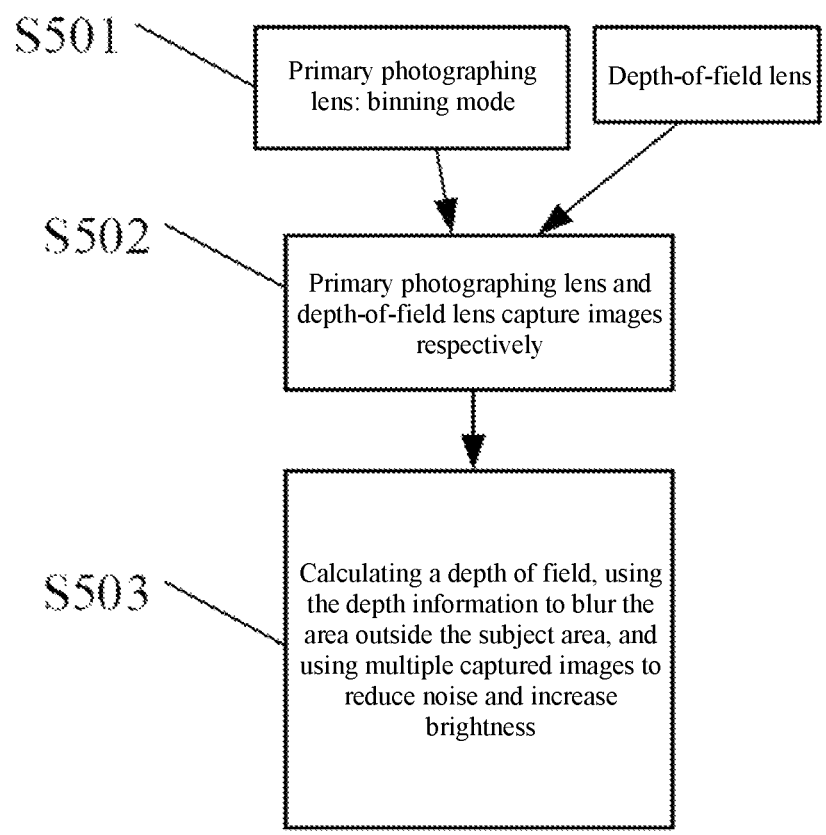
FIG. 5A is a flowchart of another exemplary photographing method according to some embodiments of the present disclosure.

In some embodiments, the image sensor is the 4-to-1 image sensor. The default camera mode is the binning mode. As such, the desired photographing effect can be obtained under various scenarios. As a special function, the full pixel mode provides an ability of photograph high resolution images. As shown in FIG. 5A, 1× magnification portrait photographing method includes the following processes. At S501, the operation mode of the primary photographing lens is adjusted to the binning mode. At S502, the primary photographing lens and the depth-of-field lens are used to photograph a target scene to obtain a first image and a second image. The first image is an image photographed by the primary photographing lens. The second image is an image photographed by the depth-of-field lens. At S503, an image processing is performed on the first image based on the first image and the second image. In some embodiments, the image processing includes: calculating a depth of field to obtain the depth information; using the depth information to blur the area outside the subject area in the first image; and using the plurality of images to reduce the noise in the first image.

Figure 5B:
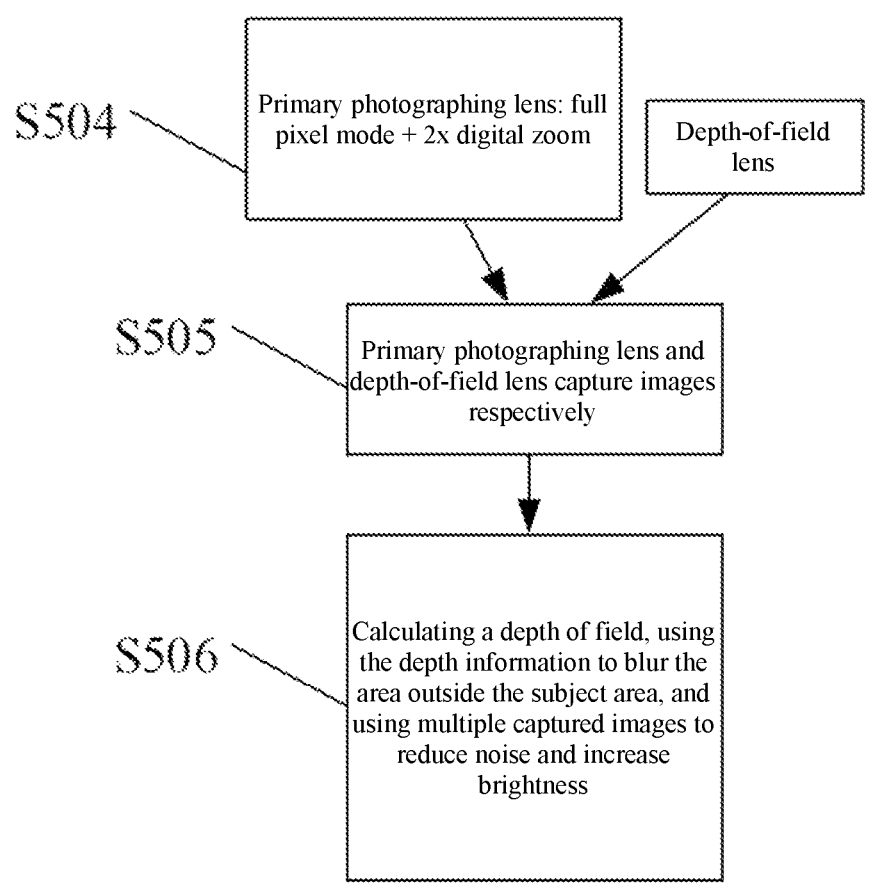
FIG. 5B is a flowchart of another exemplary photographing method according to some embodiments of the present disclosure.

As shown in FIG. 5B, 2× magnification portrait photographing method includes the following processes. At S504, the operation mode of the primary photographing lens is adjusted to the full pixel mode, and the primary photographing lens is adjusted to perform 2× digital zoom. At S505, the primary photographing lens and the depth-of-field lens are used to photograph the target scene to obtain a third image and a fourth image. The third image is an image photographed by the primary photographing lens. The fourth image is an image photographed by the depth-of-field lens. At S506, the image processing is performed on the third image based on the third image and the four image. In some embodiments, the image processing includes: calculating the depth of field to obtain the depth information; using the depth information to blur the area outside the subject area in the third image; and using the plurality of images to reduce the noise in the third image.

Figure 5C:
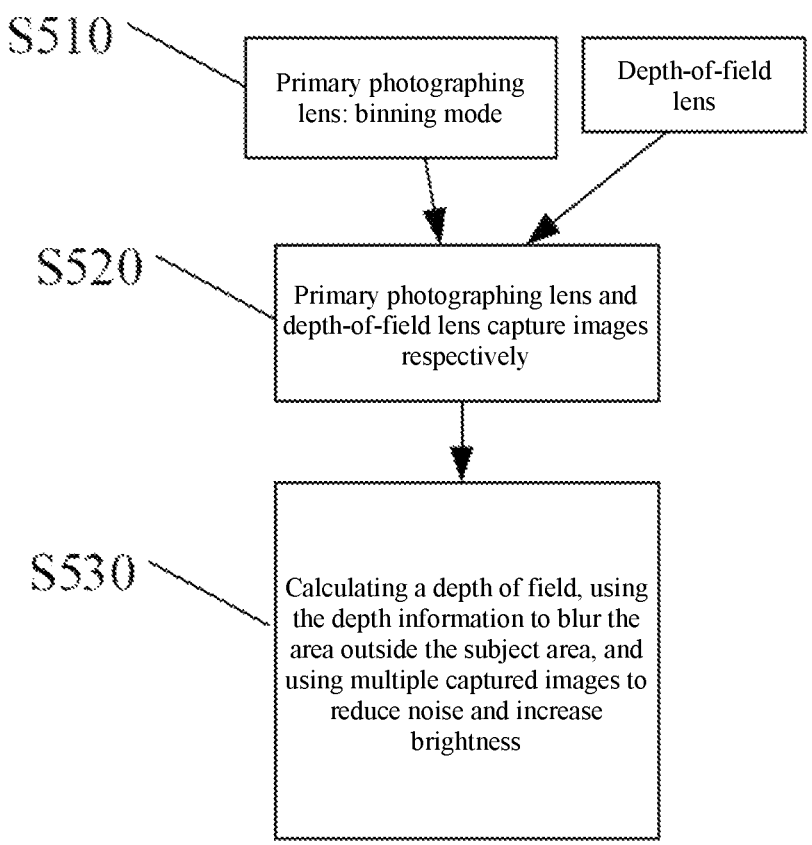
FIG. 5C is a flowchart of another exemplary photographing method according to some embodiments of the present disclosure.

In some embodiments, as shown in FIG. 5C, the image sensor is the 9-to-1 image sensor. 1× magnification portrait photographing method includes the following processes.

At S510, the operation mode of the primary photographing lens is adjusted to the binning mode. At S520, the primary photographing lens and the depth-of-field lens are used to photograph the target scene to obtain a fifth image and a six image. The fifth image is an image photographed by the primary photographing lens. The sixth image is an image photographed by the depth-of-field lens. At S530, the image processing is performed on the fifth image based on the fifth image and the sixth image. In some embodiments, the image processing includes: calculating the depth of field to obtain the depth information; using the depth information to blur the area outside the subject area in the fifth image; and using the plurality of images to reduce the noise in the fifth image.

Figure 5D:
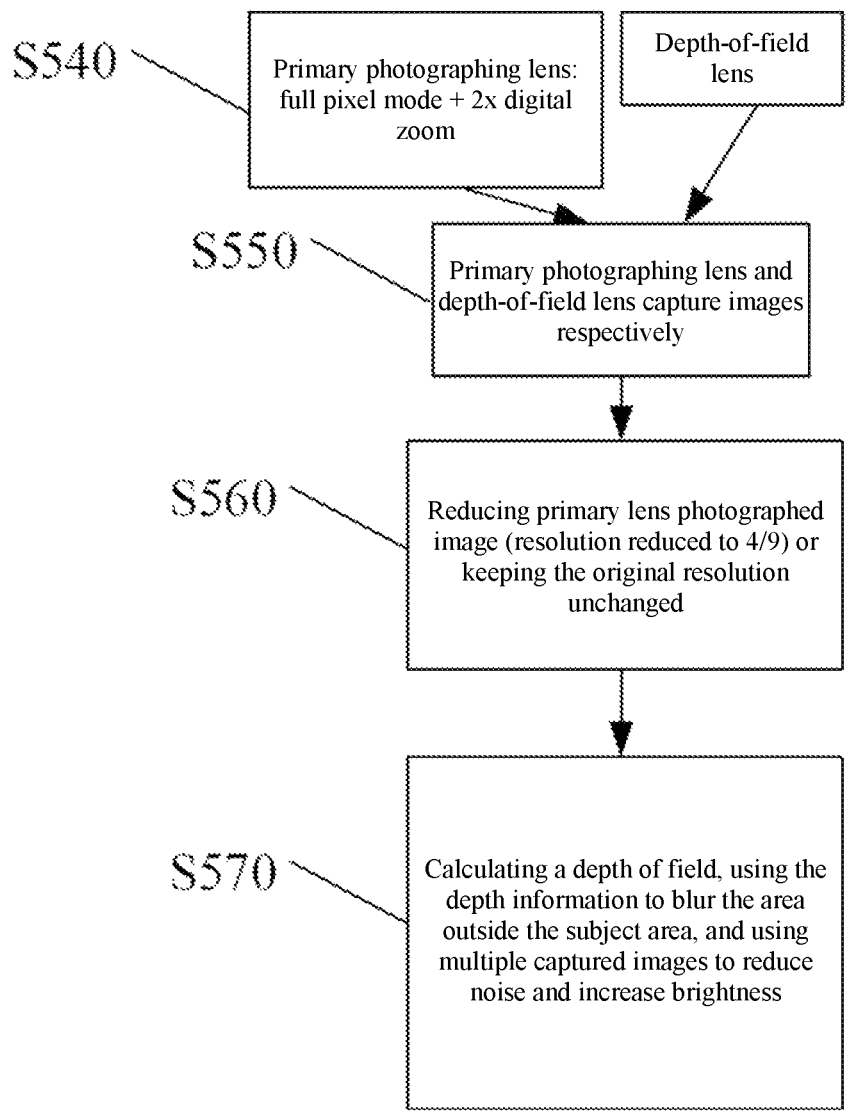
FIG. 5D is a flowchart of another exemplary photographing method according to some embodiments of the present disclosure.

As shown in FIG. 5D, 2× magnification portrait photographing method includes the following processes. At S540, the operation mode of the primary photographing lens is adjusted to the full pixel mode, and the primary photographing lens is adjusted to perform 2× digital zoom. At S550, the primary photographing lens and the depth-of-field lens are used to photograph the target scene to obtain a seventh image and an eighth image. The seventh image is an image photographed by the primary photographing lens. The eighth image is an image photographed by the depth-of-field lens. At S560, the resolution of the seventh image is reduced. At S570, the image processing is performed on the seventh image based on the seventh image and the eighth image. In some embodiments, the image processing includes: calculating the depth of field to obtain the depth information; using the depth information to blur the area outside the subject area in the seventh image; and using the plurality of images to reduce the noise in the seventh image.

Figure 6:
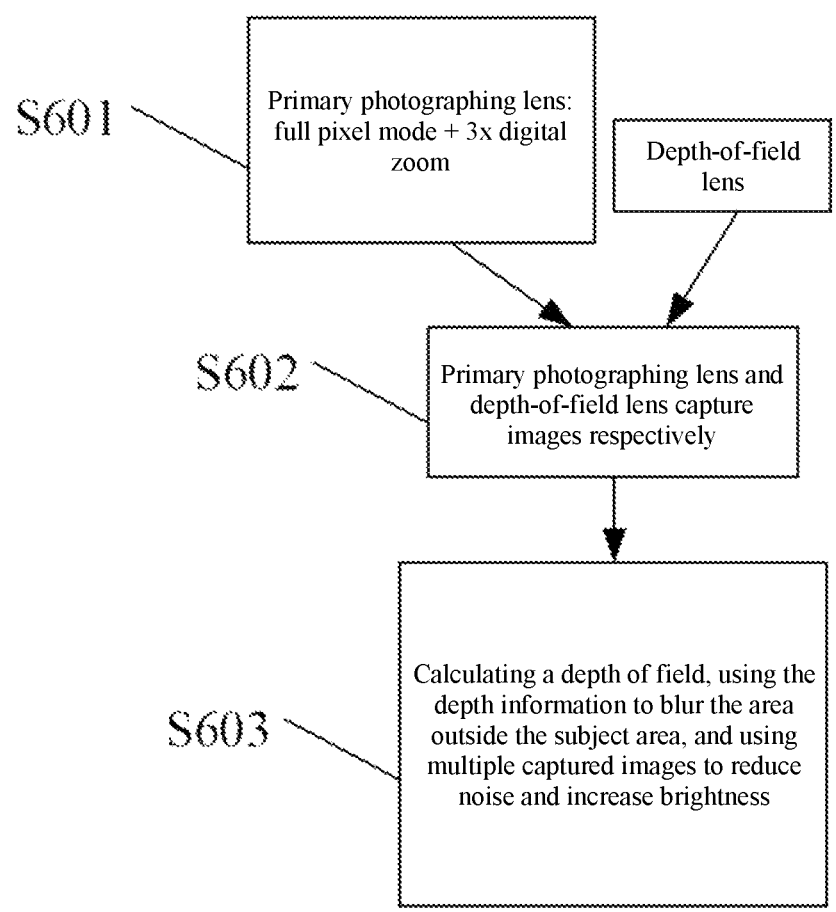
FIG. 6 is a flowchart of another exemplary photographing method according to some embodiments of the present disclosure.

As shown in FIG. 6, 3× magnification portrait photographing method includes the following processes. At S601, the operation mode of the primary photographing lens is adjusted to the full pixel mode, and the primary photographing lens is adjusted to perform 3× digital zoom. At S602, the primary photographing lens and the depth-of-field lens are used to photograph the target scene to obtain a ninth image and a tenth image. The ninth image is an image photographed by the primary photographing lens. The tenth image is an image photographed by the depth-of-field lens. At S603, the image processing is performed on the ninth image based on the ninth image and the tenth image. In some embodiments, the image processing includes: calculating the depth of field to obtain the depth information; using the depth information to blur the area outside the subject area in the ninth image; and using the plurality of images to reduce the noise in the ninth image.

In some embodiments, the image sensor is the 16-to-1 image sensor. 1× magnification portrait photographing method includes processes identical to S510 through S530. The difference is that the primary photographing lens operated in the binning mode combines sixteen pixels into one larger pixel.

2× magnification portrait photographing method includes the processes identical to S510 through S530. The difference is that the primary photographing lens operated in the binning mode combines four pixels into one larger pixel. To maintain the same resolution, 2× magnification portrait photographing method further includes: performing 2× digital zoom after the pixels are combined, such that the resolution and the number of pixels of the obtained image are the same as 1× magnification portrait.

3× magnification portrait photographing method includes the processes identical to S540 through S570. The difference is that 3× digital zoom is performed on the portrait in the full pixel mode, and resolution is reduced to 4/9, such that the resolution and the number of pixels of the obtained image are the same as 1× magnification portrait or 2× magnification portrait.

4× magnification portrait photographing method includes the processes identical to S601 through S603. The difference is that 4× digital zoom is performed on the portrait in the full pixel mode, such that the resolution and the number of pixels of the obtained image are the same as 1× magnification portrait or 2× magnification portrait or 3× magnification portrait.

In some embodiments, the image sensor is the 25-to-1 image sensor. 1× magnification portrait photographing method includes processes identical to S510 through S530. The difference is that the primary photographing lens operated in the binning mode combines twenty-five pixels into one larger pixel.

2× magnification portrait photographing method includes the processes identical to S540 through S570. The difference is that the 2*2 down-sampling is performed on the portrait in the full pixel mode, and the resolution is reduced to 16/25, such that the resolution and the number of pixels of the obtained image are the same as 1× magnification portrait.

3× magnification portrait photographing method includes the processes identical to S540 through S570. The difference is that 3× digital zoom is performed on the portrait in the full pixel mode, and the resolution is reduced to 9/25, such that the resolution and the number of pixels of the obtained image are the same as 1× magnification portrait or 2× magnification portrait.

4× magnification portrait photographing method includes the processes identical to S540 through S570. The difference is that 4× digital zoom is performed on the portrait in the full pixel mode, and the resolution is reduced to 16/25, such that the resolution and the number of pixels of the obtained image are the same as 1× magnification portrait or 2× magnification portrait or 3× magnification portrait.

5× magnification portrait photographing method includes the processes identical to S601 through S603. The difference is that 5× digital zoom is performed on the portrait in the full pixel mode, and the resolution is reduced to 16/25, such that the resolution and the number of pixels of the obtained image are the same as 1× magnification portrait or 2× magnification portrait or 3× magnification portrait or 4× magnification portrait.

In the embodiments of the present disclosure, different operation modes of the image sensor are used to photograph N magnification portraits. As such, portraits of any of N magnifications are photographed to obtain the same image resolution without pixel loss. In addition, different multi-frame image noise reduction methods are used to photograph different magnification portraits with similar image quality effects while no additional hardware cost is needed.

Based on the above-described embodiments, the present disclosure further provides a photographing apparatus. The photographing apparatus includes various modules that can be implemented by a processor in an electronic device, or logic circuits. In some embodiments, the processor may be a central processing nit (CPU), a micro processing unit (MPU), a digital signal processor (DSP), or a field programmable gate array (FPGA).

Figure 7:
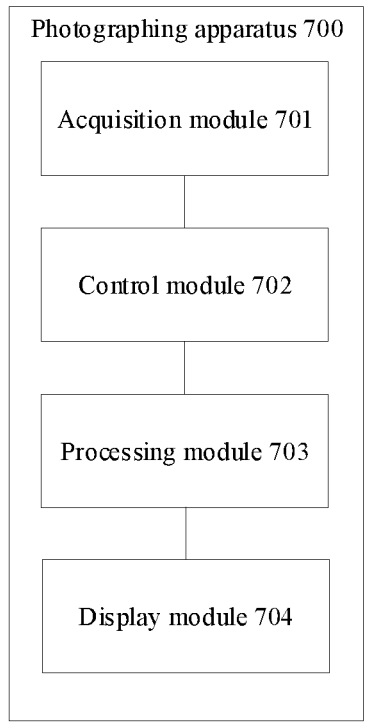
FIG. 7 is a schematic structural diagram of an exemplary photographing apparatus according to some embodiments of the present disclosure.

FIG. 7 is a schematic structural diagram of an exemplary photographing apparatus according to some embodiments of the present disclosure. As shown in FIG. 7, the photographing apparatus 700 includes an acquisition module 701, a control module 702, a processing module 703, and a display module 704.

The acquisition module 701 is configured to obtain the target photographing magnification of the target camera mode. The target photographing magnification is one of N different photographing magnifications corresponding to the target camera mode. The target camera mode corresponds to at least one camera module.

The control module 702 is configured to control the at least one camera module to capture an image based on the target photographing magnification.

The processing module 703 is configured to process the captured image.

The display module 704 is configured to display the capture image after processing.

Controlling the at least one camera module to capture the image based on the target photographing magnification includes: controlling the image sensor of the target camera module to operate in the target operation mode to capture the image based on the target photographing magnification. Different operation modes of the image sensor of the target photographing camera module correspond to different photographing magnifications.

In some embodiments, N different photographing magnifications corresponding to the target camera mode at least includes the first photographing magnification and the second magnification. The control module 702 is further configured to: determine the operation mode of the image sensor of the target camera module as the first binning mode based on the first photographing magnification. The first binning mode is used to output the sensing information with the binning pixel array. The binning pixel combines the plurality of adjacent sensing pixel units into one binning pixel unit according to the first binning rule in the pixel array of the image sensor. In some other embodiments, the control module 702 is further configured to: determine the operation mode of the image sensor of the target camera module as the full pixel mode based on the second photographing magnification. The full pixel mode is used to output the sensing information with a sensing pixel unit array of the image sensor.

In some embodiments, N different photographing magnifications corresponding to the target camera mode further includes the third photographing magnification. The third photographing magnification is between the first photographing magnification and the second photographing magnification. The control module is further configured to: determine the operation mode of the image sensor of the target camera module as the second binning mode based on the third photographing magnification, the binning rule of the second binning mode being different from the binning rule of the first binning mode; and/or control the digital zoom magnification based on the third photographing magnification, the digital zoom magnification corresponding to the third photographing magnification.

In some embodiments, the control module 702 is further configured to: control the target camera module to capture M images based on the target photographing magnification and the ambient light intensity. M is an integer greater than or equal to 1. Different numbers of images are captured for different target photographing magnifications based on different ambient light intensities.

In some embodiments, the processing module 703 is further configured to perform the noise reduction processing on M captured images.

In some embodiments, the control module 702 is further configured to: capture the image using the depth-of-field camera module. Processing the captured image further includes: calculating the depth information based on the image captured by the depth-of-field camera module.

In some embodiments, the target camera mode is the portrait mode. The processing module 703 is further configured to: processing the plurality of images captured by the image sensor of the target camera module operated in the target operation mode and controlled based on the target photographing magnification based on the depth information, such that the subject area in each of the plurality of images is clear and the area outside the subject area is blurred, and perform the noise reduction processing on the M captured images that are processed based on the depth information to generate the target image.

It should be noted here that: the description of the apparatus embodiments is similar to the description of the method embodiments, and has similar beneficial effects as the method embodiments. For technical details not disclosed in the apparatus embodiments of the present disclosure, references can be made to the description of the method embodiments of the present disclosure for understanding.

It should be noted that, in the embodiment of the present disclosure, if the above photographing method is implemented in the form of a software function module and sold or used as a standalone product, it can also be stored in a computer-readable storage medium. Based on this understanding, the technical solutions of the embodiments of the present disclosure or the part that contributes to related technologies can be embodied in the form of software products. The computer software products are stored in the storage medium and include a plurality of program instructions to cause an electronic device (which may be a smart phone with a camera, a tablet computer, etc.) to execute all or part of the photographing methods described in various embodiments of the present disclosure. The computer-readable storage medium includes: a U disk, a mobile hard disk, a read-only memory (ROM), a magnetic disk or an optical disk, and other media capable of storing program codes. Thus, the embodiments of the present application are not limited to any specific combination of hardware and software.

Correspondingly, the present disclosure further provides a computer-readable storage medium, on which a computer program is stored, and when the computer program is executed by a processor, the steps in any one of the photographing methods described in the foregoing embodiments are implemented.

Correspondingly, the present disclosure further provides a chip. The chip includes a programmable logic circuit and/or program instructions, and when the chip is running, it is used to implement any one of the photographing methods in the embodiments in the present disclosure.

Correspondingly, the present disclosure further provides a computer program product, which is used to implement the steps in any one of the photographing methods in the foregoing embodiments when the computer program product is executed by a processor of an electronic device.

Figure 8:
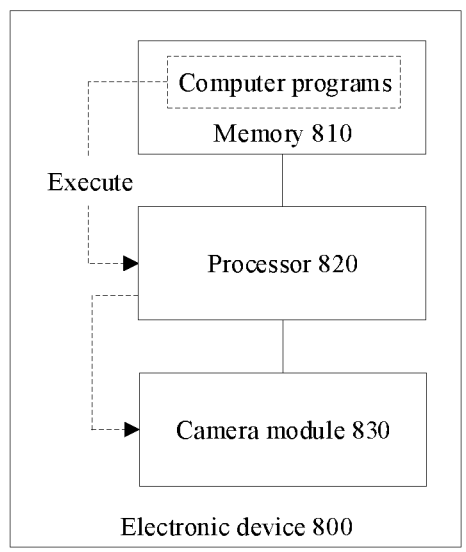
FIG. 8 is a schematic hardware diagram of an exemplary electronic device according to some embodiments of the present disclosure.

Based on the same technical concept, the present disclosure further provides an electronic device for implementing the photographing method described in the above method embodiments. FIG. 8 is a schematic hardware diagram of an exemplary electronic device according to some embodiments of the present disclosure. As shown in FIG. 8, the electronic device 800 includes a memory 810, a processor 820, and at least one camera module 830. The memory 810 stores a computer program that can run on the processor 820. The processor 820 controls the at least one camera module 830 to capture images. When the computer program is executed, the steps in any one of the photographing methods in the embodiments of the present disclosure are implemented.

The memory 810 is configured to store program instructions and applications executable by the processor 820, and also cache data to be processed or processed by the processor 820 and various modules in the electronic device (for example, image data, audio data, voice communication data, and video communication data), which can be realized by flash memory (FLASH) or random-access memory (RAM).

When the processor 820 executes the program instructions, the steps of any one of the photographing methods described above are implemented. The processor 820 generally controls the overall operation of the electronic device 800.

The above-described processor may be at least one of an application-specific integrated circuit (ASIC), a digital signal processor (DSP), a digital signal processing device (DSPD), a programmable logic device (PLD), a field programmable gate array (FPGA), a central processing unit (CPU), a controller, a microcontroller, or a microprocessor. It should be understood that the electronic device implementing the above processor function may also be another device, which is not specifically limited in the embodiment of the present disclosure.

The above-described computer storage medium/memory may be a storage medium/memory such as a read-only memory (ROM), a programmable read-only memory (PROM), an erasable programmable read-only memory (EPROM), an electrically erasable programmable read-only memory (EEPROM), a magnetic random-access memory (FRAM), a Flash memory, a magnetic surface memory, an optical disk, and a compact disc read-only memory (CD-ROM). The above-described computer storage medium/memory may also be various electronic devices including one or any combination of the above-described memories, such as a mobile phone, a computer, a tablet device, and a personal digital assistant, etc.

It should be noted that the descriptions of the above storage medium and device embodiments are similar to the description of the above method embodiments, and have similar beneficial effects to those of the method embodiments. For technical details not disclosed in the storage medium and device embodiments of the present disclosure, reference can be made to the description of the method embodiments of the present disclosure for understanding.

It should be understood that reference throughout the specification to "one embodiment" or "an embodiment" means that a particular feature, structure, or characteristic related to the embodiment is included in at least one embodiment of the present disclosure. Thus, appearances of "in one embodiment" or "in an embodiment" in various places throughout the specification are not necessarily referring to the same embodiment. Furthermore, the particular features, structures or characteristics may be combined in any suitable manner in one or more embodiments. It should be understood that, in various embodiments of the present disclosure, the sequence numbers of the above-described processes do not mean the order of execution, which should be determined by its functions and internal logic, and should not constitutes any limitation on the implementation in the embodiments of the present disclosure. The sequence numbers of the above embodiments of the present disclosure are for description only, and do not represent the advantages and disadvantages of the embodiments.

It should be noted that, in the specification, the term "comprising", "including" or any other variation thereof is intended to cover a non-exclusive inclusion such that a process, method, article, or apparatus comprising a set of elements includes not only those elements, but also includes other elements not expressly listed, or elements inherent in the process, method, article, or device. Without further limitations, an element defined by the phrase "comprising a . . . " does not preclude the presence of additional identical elements in the process, method, article, or apparatus comprising that element.

In the embodiments of the present disclosure, the apparatuses and methods may be implemented in other ways. The apparatus embodiments described above are only illustrative. For example, the division of the units is only a logical function division. In actual implementation, there may be other division methods, that is, multiple units or components can be combined, or may be integrated into another system, or some features may be ignored, or not implemented. In addition, the mutual coupling, or direct coupling, or communication connection between various components shown or discussed may be through some interfaces, and the indirect coupling or communication connection of devices or units may be in electrical, mechanical, or other form.

The units described above as separate components may or may not be physically separated. The components displayed as units may or may not be physical units, and may be located in one place or distributed to multiple network units. Part or all of the units may be selected according to actual needs to achieve the objective of the embodiment of the present disclosure.

In addition, each functional unit in each embodiment of the present disclosure may be integrated into one processing unit, or each unit may be used as a single unit, or two or more units may be integrated into one unit. The integration of the units may be realized in the form of hardware or combination of hardware and software function modules.

Alternatively, if the integrated units of the present disclosure are realized in the form of software function modules and sold or used as standalone products, they can also be stored in a computer-readable storage medium. Based on this understanding, the technical solutions of the embodiments of the present disclosure or the part that contributes to related technologies can be embodied in the form of software products. The computer software products are stored in a storage medium and include program instructions to cause the equipment automatic test line or a processor to execute all or part of the methods described in various embodiments of the present disclosure. The storage medium includes various media capable of storing program codes such as removable storage devices, ROMs, magnetic disks, or optical disks.

The methods in the embodiments of the present disclosure can be combined arbitrarily to obtain new method embodiments under the condition of no conflict. The features disclosed in several method or apparatus embodiments provided in the present disclosure may be combined arbitrarily without conflict to obtain new method embodiments or apparatus embodiments.

The above description of the disclosed embodiments enables those skilled in the art to implement or use the present disclosure. Various modifications to the embodiments will be obvious to those skilled in the art, and the general principles defined herein can be implemented in other embodiments without departing from the spirit or scope of the present disclosure. Therefore, this application will not be limited to the embodiments shown in the specification, but should conform to the broadest scope consistent with the principles and novelties disclosed in the specification.

What is claimed is:

1. A method of capturing an image, comprising:
   obtaining a target photographing magnification of a target camera mode, the target photographing magnification being one of N different photographing magnifications corresponding to the target camera mode, the target camera mode corresponding to a target camera module, N being a quantity of different photographing magnifications, N being an integer greater than 1 and associated with a maximum binning ratio of an image sensor of the target camera module, a greater N corresponding to a higher maximum binning ratio of the image sensor;
   controlling the target camera module to capture the image based on the target photographing magnification, including controlling the image sensor of the target camera module to operate in a target operation mode to capture the image based on the target photographing magnification, different operation modes of the image sensor of the target camera module corresponding to different photographing magnifications;
   processing the captured image; and
   displaying the captured image after processing.

2. The method according to claim 1, wherein:
   N different photographing magnifications corresponding to the target camera mode at least includes a first photographing magnification and a second photographing magnification; and
   controlling the image sensor of the target camera module to operate in the target operation mode to capture the image based on the target photographing magnification includes:
   determining the operation mode of the image sensor of the target camera module based on a first photographing magnification as a first binning mode, the first binning mode being used to output sensing information with a binning pixel array, and the binning pixel combining a plurality of adjacent sensing pixel units into one binning pixel unit according to a first binning rule in a pixel array of the image sensor; or determining the operation mode of the image sensor of the target camera module as a full pixel mode based on the second photographing magnification, the full pixel mode being used to output the sensing information with a sensing pixel unit array of the image sensor.

3. The method according to claim 2, wherein:

N different photographing magnifications corresponding to the target camera mode further includes a third photographing magnification, the third photographing magnification being between the first photographing magnification and the second photographing magnification; and controlling the image sensor of the target camera module to operate in the target operation mode to capture the image based on the target photographing magnification includes:

determining the operation mode of the image sensor of the target camera module based on the third photographing magnification as a second binning mode, a binning rule of the second binning mode being different from a binning rule of the first binning mode; and/or controlling a digital zoom magnification based on the third photographing magnification, the digital zoom magnification corresponding to the third photographing magnification.

4. The method according to claim 1, wherein controlling the target camera module to capture the image based on the target photographing magnification includes:

controlling the image sensor of the target camera module to operate in the target operation mode to capture M images based on the target photographing magnification, wherein M is an integer greater than or equal to 1, and the greater the target photographing magnification, the larger the number M of images to be captured.

5. The method according to claim 1, wherein controlling the target camera module to capture the image based on the target photographing magnification includes:

controlling the image sensor of the target camera module to operate in the target operation mode to capture M images based on the target photographing magnification and an ambient light intensity, wherein M is an integer greater than or equal to 1, and different numbers of images are captured for different target photographing magnifications based on different ambient light intensities.

6. The method according to claim 5, wherein processing the captured image includes:

performing a noise reduction processing on M captured images.

7. The method according to claim 5, wherein:

controlling the target camera module to capture the image based on the target photographing magnification includes capturing the image using a depth-of-field camera module; and processing the captured image further includes: calculating depth information based on the image captured by the depth-of-field camera module.

8. The method according to claim 7, wherein:

the target camera mode is a portrait mode; and processing the captured image further includes:

processing a plurality of images captured by the image sensor of the target camera module operated in the target operation mode and controlled based on the target photographing magnification based on the depth information, such that a subject area in each of the plurality of images is clear and an area outside the subject area is blurred; and performing the noise reduction processing on M captured images that are processed based on the depth information to generate a target image.

9. A apparatus of capturing an image, comprising:

a memory storing program instructions; and a processor coupled to the memory;

wherein when being executed by the processor, the program instructions cause the processor to:

obtain a target photographing magnification of a target camera mode, the target photographing magnification being one of N different photographing magnifications corresponding to the target camera mode, the target camera mode corresponding to a target camera module, N being a quantity of different photographing magnifications, N being an integer greater than 1 and associated with a maximum binning ratio of an image sensor of the target camera module, a greater N corresponding to a higher maximum binning ratio of the image sensor;

control the target camera module to capture the image based on the target photographing magnification, including controlling the image sensor of the target camera module to operate in a target operation mode to capture the image based on the target photographing magnification, different operation modes of the image sensor of the target camera module corresponding to different photographing magnifications;

process the captured image; and display the captured image after processing.

10. The apparatus according to claim 9, wherein:

N different photographing magnifications corresponding to the target camera mode at least includes a first photographing magnification and a second photographing magnification; and controlling the image sensor of the target camera module to operate in the target operation mode to capture the image based on the target photographing magnification includes:

determining the operation mode of the image sensor of the target camera module based on a first photographing magnification as a first binning mode, the first binning mode being used to output sensing information with a binning pixel array, and the binning pixel combining a plurality of adjacent sensing pixel units into one binning pixel unit according to a first binning rule in a pixel array of the image sensor; or determining the operation mode of the image sensor of the target camera module as a full pixel mode based on the second photographing magnification, the full pixel mode being used to output the sensing information with a sensing pixel unit array of the image sensor.

11. The apparatus according to claim 10, wherein:

N different photographing magnifications corresponding to the target camera mode further includes a third photographing magnification, the third photographing magnification being between the first photographing magnification and the second photographing magnification; and controlling the image sensor of the target camera module to operate in the target operation mode to capture the image based on the target photographing magnification includes:

determining the operation mode of the image sensor of the target camera module based on the third photographing magnification as a second binning mode, a binning rule of the second binning mode being different from a binning rule of the first binning mode; and/or controlling a digital zoom magnification based on the third photographing magnification, the digital zoom magnification corresponding to the third photographing magnification.

12. The apparatus according to claim 9, wherein when controlling the target camera module to capture the image based on the target photographing magnification, the processor is further configured to:

control the image sensor of the target camera module to operate in the target operation mode to capture M images based on the target photographing magnification, wherein M is an integer greater than or equal to 1, and the greater the target photographing magnification, the larger the number M of images to be captured.

13. The apparatus according to claim 9, wherein when controlling the target camera module to capture the image based on the target photographing magnification, the processor is further configured to:

control the image sensor of the target camera module to operate in the target operation mode to capture M images based on the target photographing magnification and an ambient light intensity, wherein M is an integer greater than or equal to 1, and different numbers of images are captured for different target photographing magnifications based on different ambient light intensities.

14. The apparatus according to claim 13, wherein when processing the captured image, the processor is further configured to:

perform a noise reduction processing on M captured images.

15. The apparatus according to claim 13, wherein:

controlling the target camera module to capture the image based on the target photographing magnification includes capturing the image using a depth-of-field camera module; and processing the captured image further includes: calculating depth information based on the image captured by the depth-of-field camera module.

16. The apparatus according to claim 15, wherein:

the target camera mode is a portrait mode; and
processing the captured image further includes:

processing a plurality of images captured by the image sensor of the target camera module operated in the target operation mode and controlled based on the target photographing magnification based on the depth information, such that a subject area in each of the plurality of images is clear and an area outside the subject area is blurred; and performing the noise reduction processing on M captured images that are processed based on the depth information to generate a target image.

17. An electronic device, comprising:
a memory storing program instructions;
a processor coupled to the memory; and
at least one camera module;
wherein when being executed by the processor, the program instructions cause the processor to:

obtain a target photographing magnification of a target camera mode, the target photographing magnification being one of N different photographing magnifications corresponding to the target camera mode, the target camera mode corresponding to the at least one camera module, N being a quantity of different photographing magnifications, N being an integer greater than 1 and associated with a maximum binning ratio of an image sensor of the at least one camera module, a greater N corresponding to a higher maximum binning ratio of the image sensor;

control the at least one camera module to capture an image based on the target photographing magnification, including controlling the image sensor of the at least one camera module to operate in a target operation mode to capture the image based on the target photographing magnification, different operation modes of the image sensor of the at least one camera module corresponding to different photographing magnifications;

process the captured image; and
display the captured image after processing.

18. The electronic device according to claim 17, wherein:

N different photographing magnifications corresponding to the target camera mode at least includes a first photographing magnification and a second photographing magnification; and controlling the image sensor of the at least one camera module to operate in the target operation mode to capture the image based on the target photographing magnification includes:

determining the operation mode of the image sensor of the at least one camera module based on a first photographing magnification as a first binning mode, the first binning mode being used to output sensing information with a binning pixel array, and the binning pixel combining a plurality of adjacent sensing pixel units into one binning pixel unit according to a first binning rule in a pixel array of the image sensor; or determining the operation mode of the image sensor of the at least one camera module as a full pixel mode based on the second photographing magnification, the full pixel mode being used to output the sensing information with a sensing pixel unit array of the image sensor.

19. The electronic device according to claim 18, wherein:

N different photographing magnifications corresponding to the target camera mode further includes a third photographing magnification, the third photographing magnification being between the first photographing magnification and the second photographing magnification; and controlling the image sensor of the at least one camera module to operate in the target operation mode to capture the image based on the target photographing magnification includes:

determining the operation mode of the image sensor of the at least one camera module based on the third photographing magnification as a second binning mode, a binning rule of the second binning mode being different from a binning rule of the first binning mode; and/or controlling a digital zoom magnification based on the third photographing magnification, the digital zoom magnification corresponding to the third photographing magnification.

20. The electronic device according to claim 17, wherein when controlling the at least one camera module to capture the image based on the target photographing magnification, the processor is further configured to:

control the image sensor of the at least one camera module to operate in the target operation mode to capture M images based on the target photographing magnification and an ambient light intensity, wherein M is an integer greater than or equal to 1, and different numbers of images are captured for different target photographing magnifications based on different ambient light intensities.

* * * * *